(12) United States Patent
Ding et al.

(10) Patent No.: US 10,509,510 B2
(45) Date of Patent: *Dec. 17, 2019

(54) TOUCH DISPLAY PANEL HAVING PRESSURE DETECTING FUNCTION, DISPLAY DEVICE AND DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Weijie Zhao, Beijing (CN); Shengji Yang, Beijing (CN); Wei Liu, Beijing (CN); Tao Ren, Beijing (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,456

(22) Filed: Mar. 16, 2018

(65) Prior Publication Data

US 2018/0203569 A1 Jul. 19, 2018

Related U.S. Application Data

(62) Division of application No. 15/519,268, filed as application No. PCT/CN2016/072707 on Jan. 29, 2016, now Pat. No. 9,971,449.

(30) Foreign Application Priority Data

Sep. 11, 2015 (CN) .......................... 2015 1 0580210

(51) Int. Cl.
  *G06F 3/041* (2006.01)
  *G06F 3/044* (2006.01)
  (Continued)

(52) U.S. Cl.
  CPC .......... *G06F 3/0416* (2013.01); *G02F 1/1368* (2013.01); *G02F 1/133512* (2013.01);
  (Continued)

(58) Field of Classification Search
  CPC .... G06F 3/0414; G06F 3/0412; G06F 3/0416; G06F 3/044
  See application file for complete search history.

(56) References Cited

U.S. PATENT DOCUMENTS

2012/0043140 A1 2/2012 Peterson et al.
2015/0062066 A1 3/2015 Shih et al.
(Continued)

FOREIGN PATENT DOCUMENTS

CN 102138120 A 7/2011
CN 103852921 A 6/2014
(Continued)

OTHER PUBLICATIONS

International Search Report and Written Opinon dated Jun. 2, 2016; PCT/CN2016/072707.
(Continued)

*Primary Examiner* — Xuemei Zheng (57) ABSTRACT

A touch display panel having a pressure detecting function, a display device and a driving method are provided. The touch display panel includes: an array substrate and a counter substrate that are arranged opposite to each other; a plurality of touch electrodes disposed on the counter substrate and a touch electrode wiring electrically connected to each of the touch electrodes; a plurality of pressure detecting electrodes disposed on the counter substrate or the array (Continued)

substrate and a pressure detecting electrode wiring electrically connected to each of the pressure detecting electrodes, wherein any one of the pressure detecting electrodes overlaps with at least one of the touch electrodes in a direction perpendicular to the counter substrate, and with respect to the pressure detecting electrode, the touch electrode is closer to a light exit side of the touch display panel.

10 Claims, 7 Drawing Sheets

(51) Int. Cl.
  *G02F 1/1335* (2006.01)
  *G02F 1/1343* (2006.01)
  *G02F 1/1362* (2006.01)
  *G02F 1/1368* (2006.01)
  *G06F 3/047* (2006.01)
  *G02F 1/1333* (2006.01)

(52) U.S. Cl.
  CPC .. *G02F 1/134309* (2013.01); *G02F 1/136286* (2013.01); *G06F 3/044* (2013.01); *G06F 3/047* (2013.01); *G06F 3/0412* (2013.01); *G06F 3/0414* (2013.01); *G02F 1/13338* (2013.01); *G02F 2201/121* (2013.01); *G06F 2203/04105* (2013.01); *G06F 2203/04111* (2013.01)

(56) References Cited

U.S. PATENT DOCUMENTS

| | | | |
|---|---|---|---|
| 2015/0062068 A1 | 3/2015 | Shih et al. | |
| 2016/0062504 A1 | 3/2016 | Hwang et al. | |
| 2016/0092015 A1* | 3/2016 | Al-Dahle | G06F 3/044 345/174 |
| 2017/0068372 A1 | 3/2017 | Kim et al. | |
| 2017/0123540 A1* | 5/2017 | Shih | G06F 3/0412 |
| 2017/0205924 A1* | 7/2017 | Kim | G06F 3/0412 |
| 2017/0269758 A1* | 9/2017 | Wen | G06F 3/0414 |
| 2018/0321788 A1* | 11/2018 | Kimura | G02F 1/133 |

FOREIGN PATENT DOCUMENTS

| | | |
|---|---|---|
| CN | 103907081 A | 7/2014 |
| CN | 104220964 A | 12/2014 |
| CN | 104423740 A | 3/2015 |
| CN | 104679359 A | 6/2015 |
| CN | 105068695 A | 11/2015 |
| EP | 2410407 A1 | 1/2012 |

OTHER PUBLICATIONS

The First Chinese Office Action dated Aug. 1, 2017: Appln. No. 201510580210.7.
The Second Chinese Office Action dated Feb. 24, 2018; Appln. No. 201510580210.7.
USPTO NFOA dated Oct. 20, 2017 in connection with U.S. Appl. No. 15/519,268.
USPTO NOA dated Dec. 20, 2017 in connection with U.S. Appl. No. 15/519,268.
USPTO Response to Amendment under Rule 312.
The Third Chinese Office Action dated Jul. 20, 2018; Appln. No. 201510580210.7.

* cited by examiner

| In a touch phase P2, the first IC inputs a drive signal to the touch electrodes 10 through the touch electrode wirings 20 and receives a feedback signal to identify a touch position | ─S10 |

| In a pressure detection phase P3, the first IC inputs a fixed voltage signal to the touch electrodes 10 through the touch electrode wirings 20, the second IC inputs a drive signal to the pressure detecting electrodes 30 through the pressure detecting wirings 40 and receives a feedback signal to detect a pressure value; and a signal line between the pressure detecting electrodes 30 and the touch electrodes 10 is controlled in a high resistance state | ─S11 |

TOUCH DISPLAY PANEL HAVING PRESSURE DETECTING FUNCTION, DISPLAY DEVICE AND DRIVING METHOD

TECHNICAL FIELD

Embodiments of the present invention relate to a touch display panel with pressure detecting function, a display device and a driving method.

BACKGROUND

Pressure sensing technology is a technology that can detect an external force, for example, a pressure in the current environment can be tested to determine whether it is consistent with its physical adaptability through the technology, and can enable customers to get a better human-computer interaction experience. As a result, many manufactures are looking for appropriate solutions to achieve pressure test in a display area, especially a portable electronic device such as a cell phone or a tablet.

At present, in field of the display, an additional institution is generally added in a backlight module of a liquid crystal display device (referred to as LCD) or the mid frame of a cell phone to achieve the pressure detection. However, the design needs to change the structural design of the liquid crystal display device, and a detecting accuracy of the design is limited due to a large assembly tolerance.

SUMMARY

Embodiments according to the present invention provide a touch display panel with pressure detecting function, comprising: an array substrate and an opposed substrate that are disposed opposite to each other; a plurality of touch electrodes and touch electrode wirings electrically connected to each of the touch electrodes disposed on the opposed substrate; a plurality of pressure detecting electrodes and pressure detecting electrode wirings electrically connected to each of the pressure detecting electrodes disposed on the opposed substrate or the array substrate; wherein, any of the pressure detecting electrodes overlaps with at least one of the touch electrodes in a direction perpendicular to the opposed substrate; the touch electrodes are closer to a light exit side of the touch display panel with respect to the pressure detecting electrodes.

In some examples, the pressure detecting electrodes also used as common electrodes.

In some examples, the pressure detecting electrodes are disposed on the array substrate.

In some examples, the array substrate further comprises a thin film transistor, a gate line and a data line; the gate line is disposed on the same layer as a gate electrode of the thin film transistor, the data line is disposed on the same layer as a source electrode and a drain electrode of the thin film transistor; the pressure detecting electrode wirings are disposed on the same layer as the gate line or the data line.

In some examples, the array substrate further comprises auxiliary wirings located in a non-display area, the auxiliary wirings correspond to the touch electrode wirings one by one, and the auxiliary wirings are electrically connected to the touch electrode wirings.

In some examples, the opposed substrate further comprises a black matrix; the touch electrodes are of a lattice structure, and located on a side of the black matrix closed to the array substrate and corresponding to the black matrix; wherein, the touch electrodes have a material of metal.

In some examples, a capacitor is formed between each of the pressure detecting electrodes and at least one of the touch electrodes overlapping therewith.

Other embodiments according to the present invention provide a display device, comprising: the touch display panel, and a first integrated circuit (IC) connected to the touch electrode wiring and a second IC connected to the pressure detecting wiring.

In some examples, the display device further comprises a metal back shell, and the touch display panel is disposed on the metal back shell.

In some examples, the pressure detecting electrodes are disposed on the array substrate, the array substrate comprises a pixel electrode; the pressure detecting electrodes are closer to the metal back shell with respect to the pixel electrode on the array substrate.

In some examples, a capacitor is formed between the pressure detecting electrodes and the metal back shell.

Other embodiments according to the present invention provide a driving method of the display device, comprising: a touch phase in which the first IC inputs a drive signal to the touch electrodes through the touch electrode wirings and receives a feedback signal to identify a touch position; a pressure detecting phase in which the first IC inputs a fixed voltage signal to the touch electrodes through the touch electrode wirings, the second IC inputs a drive signal to the pressure detecting electrodes through the pressure detecting wirings and receives a feedback signal to detect a pressure value; and a signal line between the pressure detecting electrodes and the touch electrodes is controlled in a high resistance state; wherein, the signal line comprises at least one of a gate line and a data line.

In some examples, the display device further comprises a metal back shell, a capacitor is formed between the pressure detecting electrodes and the metal back shell, in the pressure detecting phase, the driving method further comprises: controlling a signal line between the pressure detecting electrodes and the metal back shell in a high resistance state.

In some examples, the display device comprises a third IC connected to the gate line and a fourth IC connected to the data line, the driving method further comprising: a display phase in which the third IC inputs a scanning signal to the gate line in a line sequence, the fourth IC inputs a data signal to the data line; and the first IC and the second IC input common voltage signals to the touch electrodes and the pressure detecting electrodes, respectively; wherein, the pressure detecting electrodes also used as common electrodes.

In some examples, in the touch phase, modulation signals with the same frequency and the same amplitude as those for the touch electrodes are simultaneously input from the second IC to the pressure detecting electrodes, from the third IC to the gate line, and from the fourth IC to the data line.

BRIEF DESCRIPTION OF THE DRAWINGS

In order to clearly illustrate the technical solution of the embodiments of the present invention, the drawings of the embodiments will be briefly described in the following; it is obvious that the drawings in the description are only related to some embodiments of the present invention and not limited to the invention.

DETAILED DESCRIPTION

In order to make objects, technical details and advantages of the embodiments of the present invention, the technical solutions of the embodiments will be described in a clearly and fully understandable way in connection with the drawings related to the embodiments of the present invention. Apparently, the described embodiments are just a part but not all of the embodiments of the present invention. Based on the described embodiments herein, those skilled in the art can obtain other embodiment(s), without any inventive work, which should be within the scope of the present invention.

Unless otherwise defined, the technical terminology or scientific terminology used herein should have the general meanings understood by those skills in the art to which the present invention belongs. The "first", "second" and similar words used in the present invention application specification and claims do not mean any sequence, amount or importance, but are merely used to distinguish different components. Likewise, "a" or "an" or similar words do not mean the limitation to amount, instead, it refers to at least one. "Connecting" or "connected" and similar words are not limited to the physical or mechanical connection, but may comprise electrical connection, no matter directly or indirectly. "Over", "under" and the like are merely used to denote the relative location relationship which based on the relationship described in drawings, and only to describe the present invention conveniently.

Embodiments of the present invention provide a touch display panel 01 with pressure detecting function, as illustrated in FIG. 1-FIG. 4, the touch display panel comprises: an opposed substrate 02 and an array substrate 03 that are disposed opposite to each other, a plurality of touch electrodes 10 and touch electrode wirings 20 electrically connected to each of the touch electrodes 10 disposed on the opposed substrate 02; a plurality of pressure detecting electrodes 30 and pressure detecting electrode wirings 40 electrically connected to each of the pressure detecting electrodes 30 disposed on the opposed substrate 02 or the array substrate 03; and any of the pressure detecting electrodes 30 corresponds to at least one of the touch electrodes 10, that is, in a direction perpendicular to the opposed substrate 02, the pressure detecting electrodes 30 are overlapped with at least one of the touch electrodes 10; the touch electrodes 10 are closer to a light exit side of the touch display panel 01 with respect to the pressure detecting electrodes 30.

Figure 1:
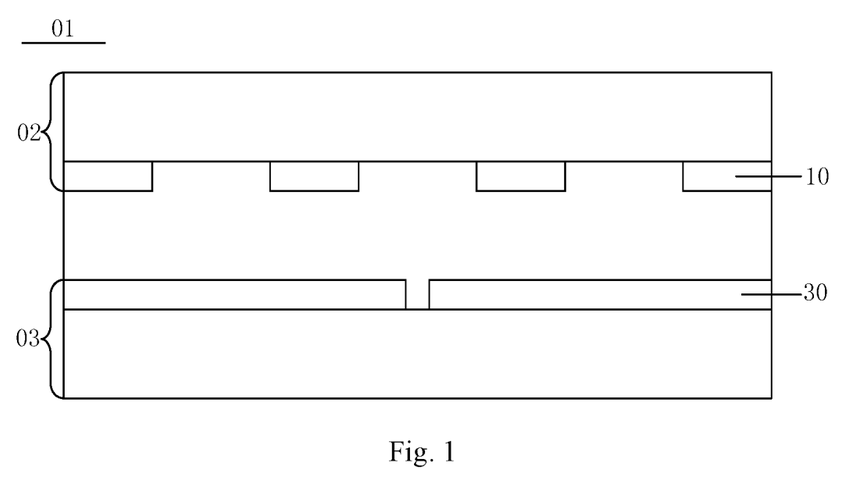
FIG. 1 is a first structural view of a touch display panel with pressure detecting function provided by embodiments of the present invention.
Figure 2:
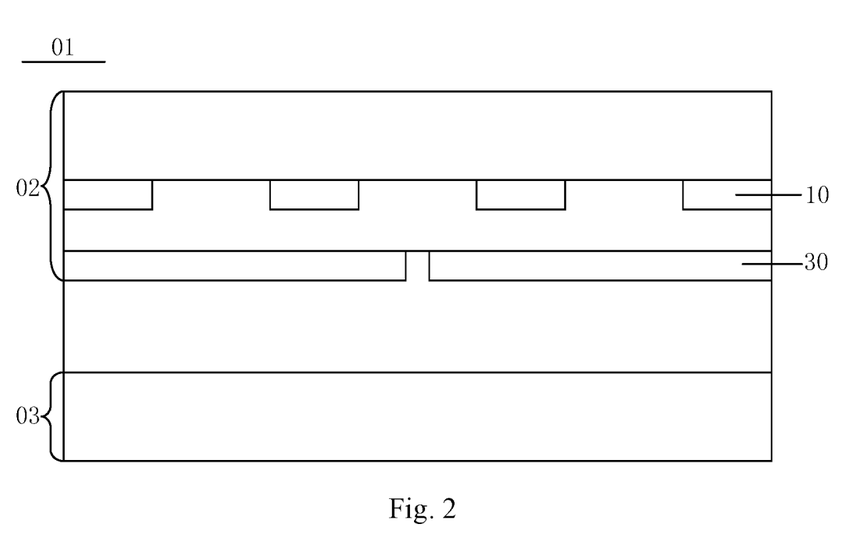
FIG. 2 is a second structural view of a touch display panel with pressure detecting function provided by embodiments of the present invention.

In embodiments of the present invention, the principle for achieving a touch function is: due to effect of the electric field in a human body, when a finger contacts a light exit side of the touch display panel 01, as a conductor, the finger forms an external capacitor (Cf) together with the touch electrodes 10 on the opposed substrate 02. The external capacitor (Cf) and a self inductance capacitor (Cp) of the touch control electrode 10 form a coupling electric field between the touch control electrode (10) and the fingers, which can change the size of the self inductance capacitor (Cp). According to the change of the capacitance on the touch point position, the touch point position is calculated, and the touch function is achieved.

The principle for achieving pressure detecting is: due to the pressure detecting electrodes 30 correspond to at least one of the touch electrodes 10, according to the formula of parallel plate capacitance, that is $$C \propto \varepsilon \frac{S}{d},$$

when an overlapping area (S) exists between the pressure detecting electrodes 30 and the touch electrodes 10 along a direction of a distance (d) of the two, a capacitance (C) is generated between the two. On the basis of this, when the touch display panel 01 is not under pressure, the capacitance between the pressure detecting electrodes 30 and the corresponding touch electrodes 10 is fixed. When the touch display panel 01 is subjected to a pressure, the distance between the pressure detecting electrodes 30 and the touch electrodes 10 changes due to a deformation of the touch display panel 01, so that the capacitance between the pressure detecting electrodes 30 and the corresponding touch electrodes 10 changes, and a pressure value can be obtained by a corresponding conversion.

It should be noted that, the touch electrodes 10 correspond to the touch electrode wirings 20 one by one, and the touch electrodes 10 are electrically connected to the touch electrode wirings 20. They can be located in the same layer and are electrically connected directly, and can also be located in different layers, and are electrically connected through a through hole.

The pressure detecting electrodes 30 correspond to the pressure detecting electrode wirings 40 one by one, and the pressure detecting electrodes 30 are electrically connected the pressure detecting electrode wirings 40. They can be located in the same layer and are electrically connected directly, and can also be located in different layers, and are electrically connected through a through hole.

Figure 3:
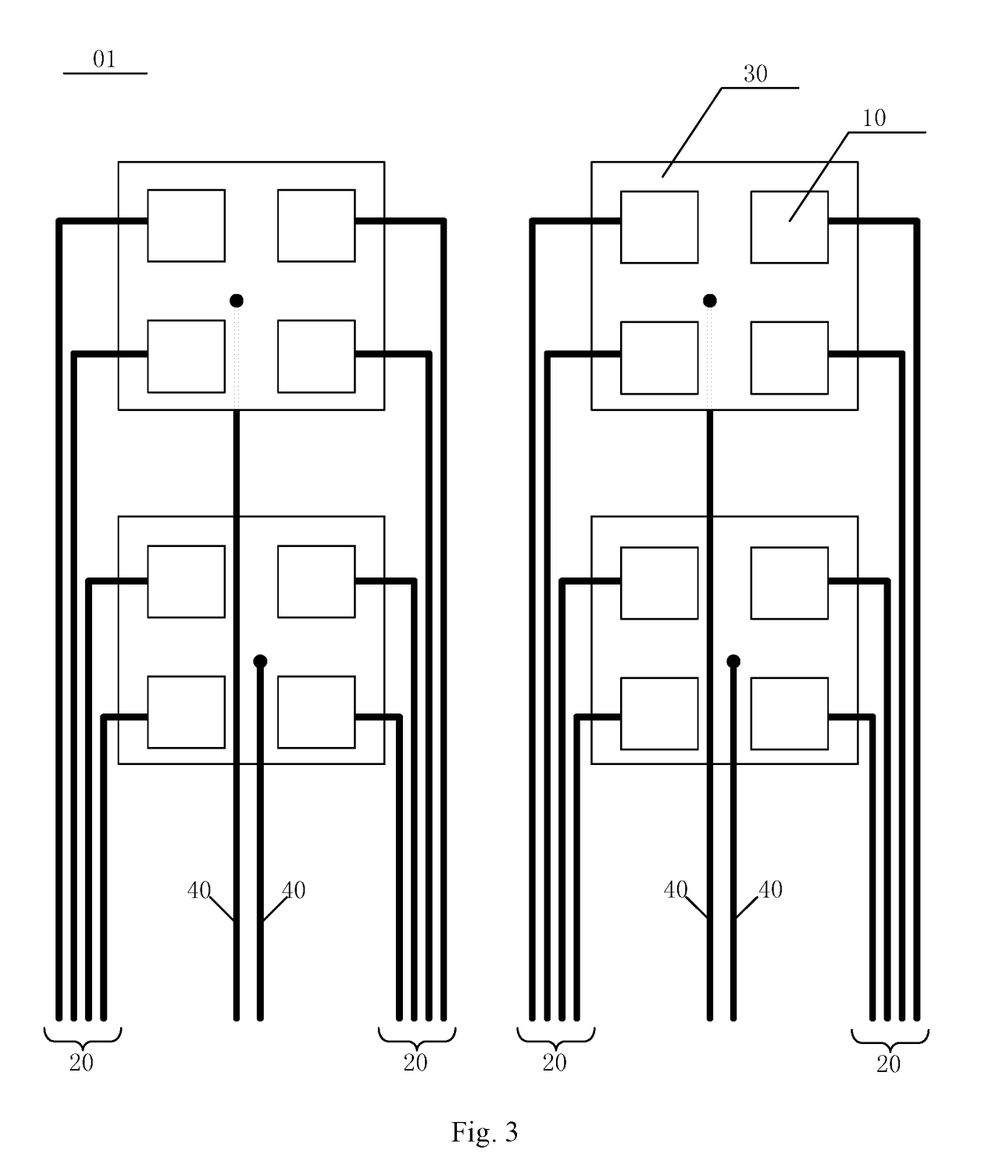
FIG. 3 is a top view of a touch display panel with pressure detecting function provided by embodiments of the present invention.

Furthermore, FIG. 3 only illustrates schematically the connection way between the touch electrodes 10 and the touch electrode wirings 20, however, embodiments of the present invention are not limited to this with respect to the connection way between the pressure detecting electrodes 30 and the pressure detecting electrode wirings 40.

The pressure detecting electrodes 30 can be located on the array substrate 03 as illustrated in FIG. 1, and can also be located on the opposed substrate 02. Although the pressure detecting wirings 40 are not illustrated in FIG. 1 and FIG. 2, the pressure detecting electrodes 30 and the pressure detecting electrode wirings 40 are located on the same substrate.

According to the accuracy of pressure detection, along a direction perpendicular to the touch display panel 01, a projection area of the pressure detecting electrodes 30 on the opposed substrate 02 or the array substrate 03 can be adjusted appropriately. When the accuracy of pressure detection is higher, the projection area of the pressure detecting electrodes 30 is smaller. When the accuracy of pressure detection is lower, the projection area of the pressure detecting electrodes 30 is larger.

Furthermore, the pressure detecting electrodes 30 has a material of transparent conductive material, such as ITO, so that to avoid the impact on the normal display of the touch display panel 01.

The material of the touch electrodes 10 is not limited, and the touch electrodes 10 can be made of a transparent conductive material or a metal material. When the touch electrodes 10 are made of a metal material, as illustrated in FIG. 4, in order not to affect the display, the touch electrodes 10 should be set at a position corresponding to a black matrix 90.

Figure 4:
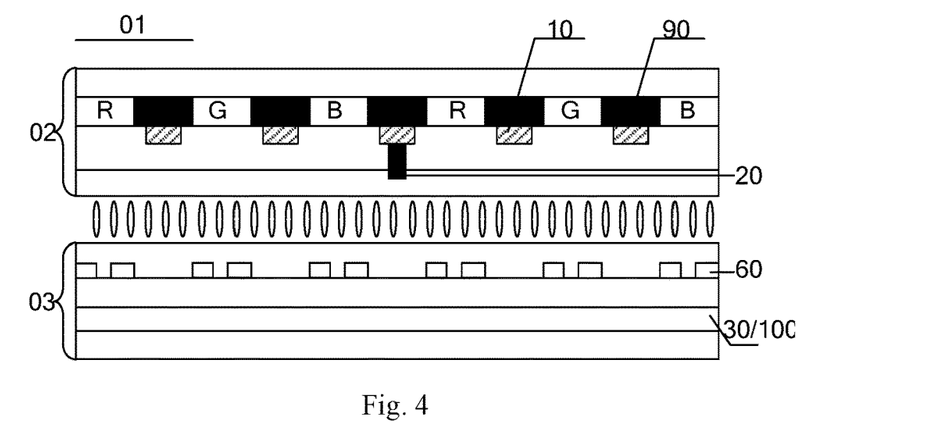
FIG. 4 is a structural view of a touch liquid crystal display panel with pressure detecting function provided by embodiments of the present invention.

As illustrated in FIG. 4, the touch display panel 01 can be a touch liquid crystal display panel, on this basis, the opposed substrate 02 can be a color filter substrate, which further comprises a black matrix, a red color filter R, a green color filter G and a blue color filter B, and also comprises a common electrode certainly. The array substrate 03 comprises a thin film transistor (not illustrated in FIG. 4), a pixel electrode 60 and so on. Of course, the array substrate 03 further comprises a common electrode in the case that the opposed substrate 02 does not comprise the common electrode.

The touch display panel 01 can also be an organic light emitting diode display panel, on this basis, the opposed substrate 02 can be a package substrate. The array substrate 03 comprises a thin film transistor, an anode electrically connected to a drain of the thin film transistor, cathode, and an organic material functional layer between the anode and the cathode.

Embodiments of the present invention provide the touch display panel 01 with pressure detecting function, on one aspect, the recognition of the touch position can be realized by setting the touch electrodes 10 and touch electrode wirings 20. On the other aspect, a capacitor is formed between the pressure detecting electrodes 30 and the touch electrodes 10 by setting the pressure detecting electrodes 30. When the touch display panel 01 is subjected to a pressure, a capacitance value of the capacitor is changed, the pressure can be detected through the pressure detecting electrode wirings 40 sending a signal which indicates the capacitance value to a corresponding IC (integrated circuit). Compared with an additional mechanism needed in the prior art, the present invention can be realized by mostly adding a corresponding patterning process in the preparation process of the display panel, and a mechanism design of the device does not need to be changed.

In some examples, as illustrated in FIG. 4, the touch display panel is the touch liquid crystal display panel, the pressure detecting electrodes 30 are also used as common electrodes 100. That is to say, a layer of the common electrodes 100 are also used as a layer of the pressure detecting electrodes 30.

For example, a transparent electrode layer can be divided into a plurality of regions, in a display phase, each of the regions is one common electrode 100, and in a pressure detecting phase, each of the regions is one pressure detecting electrode 30.

Thus, in spite of the fact that embodiments of the present invention are provided with the pressure detecting electrodes 30, the number of patterning processes is not increased.

It should be noted that, the transparent electrode layer disposed on the array substrate 03 is as an example as illustrated in FIG. 4, the transparent electrode layer can also be disposed on the opposed substrate 02.

Figure 5:
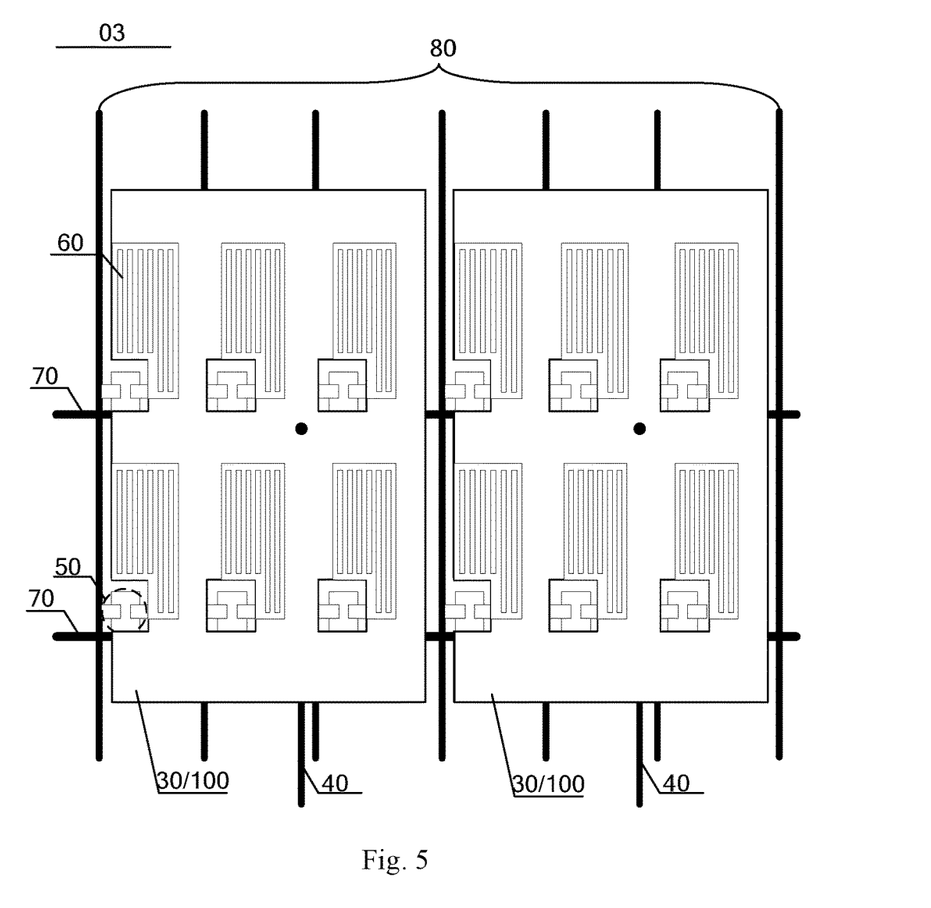
FIG. 5 is a first top view of an array substrate of a touch liquid crystal display panel with pressure detecting function provided by embodiments of the present invention.

In some examples, as illustrated in FIG. 4 and FIG. 5, the pressure detecting electrodes 30 are disposed on the array substrate 03.

The array substrate 03 further comprises a thin film transistor 50, a pixel electrode 60, a gate line 70 and a data line 80; the thin film transistor comprises a gate electrode, a gate insulating layer, an active layer, a source and a drain, the drain electrode is electrically connected to the pixel electrode 60, the source electrode is electrically connected to the data line 80, and the gate electrode is electrically connected to the gate line 70.

Thus, in the display phase, the use of advanced super dimensional switching (referred to as ADS) can improve an image quality of the device, and the device can be with high resolution, high transmission rate, low power consumption, wide viewing angle, high aperture ratio, low color, and no squeezing water ripple (Push Mura) etc. Due to the common electrodes 100 are also used as the pressure detecting electrodes 30, and the accuracy of the pressure detecting electrodes 30 are not necessarily as small as a sub-pixel size. In embodiments of the present invention, the common electrodes 100 are plate electrodes, the pixel electrode 60 is a strip electrode, and the pixel electrode 60 is located above the common electrodes 100.

In some examples, the pressure detecting electrode wirings 40 are disposed on the same layer as the gate line 70, or the pressure detecting electrode wirings 40 are disposed on the same layer as the data line 80. The gate line 70 is disposed on the same layer as the gate electrode of the thin film transistor 50, and the data line 80 is disposed on the same layer as the source electrode and the drain electrode of the thin film transistor 50.

In this way, the increase of the number of the patterning process caused by the formation of the pressure detecting electrodes 40 is also avoided.

For example, the touch electrodes 10 on the opposed substrate 02 can have a material of metal. Because of a metal material has a low resistance, a touch sensitivity can be improved.

Figure 6:
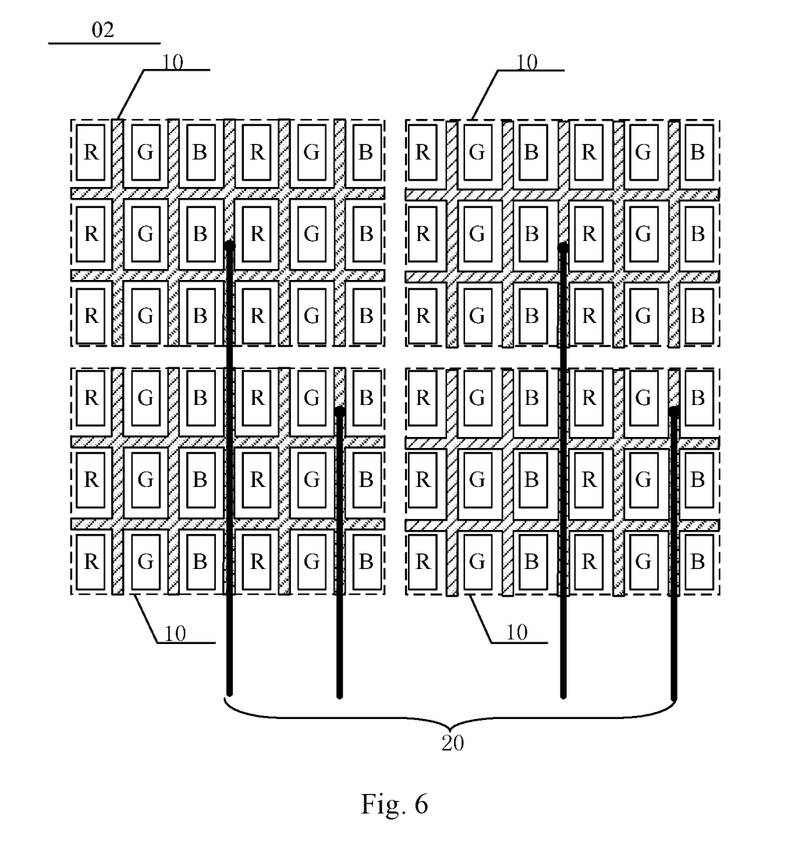
FIG. 6 is a top view of an opposed substrate of a touch liquid crystal display panel with pressure detecting function provided by embodiments of the present invention.

In some examples, as illustrated in FIG. 6, the touch electrodes 10 are of a lattice structure, and as illustrated in 4, the touch electrodes 10 located on a side of the black matrix 90 closed to the array substrate 02 and corresponding to the black matrix 90.

In this way, the influence on display by the touch electrodes 10 can be avoided.

Figure 7:
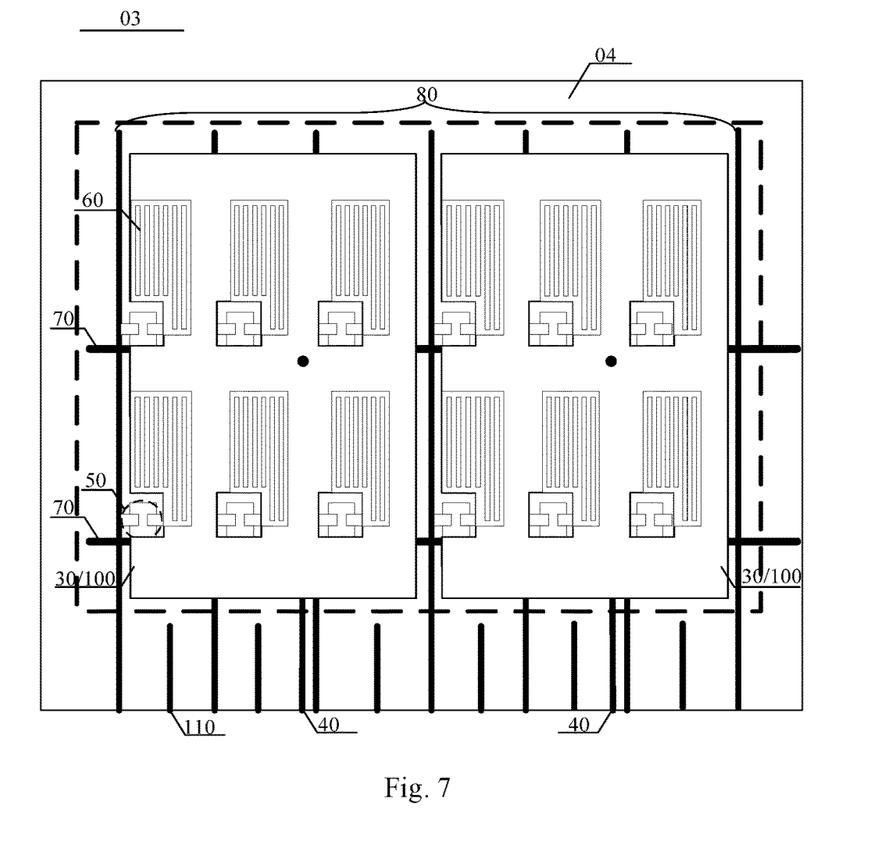
FIG. 7 is a second top view of an array substrate of a touch liquid crystal display panel with pressure detecting function provided by embodiments of the present invention.

Furthermore, since the touch electrode wirings 20 located on the opposed substrate 02 need to be connected to a corresponding integrated circuit (IC) to drive the touch electrodes 10 to identify a touch position, a circuit board provided with the IC is required to be pressed on the opposed substrate 02 to provide a signal to the touch electrode wirings 20. And for the array substrate 03, a corresponding circuit board needs to be pressed on the array substrate 03, in order to provide a signal to the gate line 70, the data line 80, and so on. Therefore, in embodiments of the present invention, all of the IC can be integrated on the circuit board which is pressed on the array substrate 03. For example, as illustrated in FIG. 7, auxiliary wirings 110 can be disposed on a non-display area 04 of the array substrate, the auxiliary wirings 110 correspond to the touch electrode wirings 20 one by one, and the auxiliary wirings 110 are electrically connected to the touch electrode wirings 20 by conductive adhesive.

It should be noted that, the non-display area 04 is relative to a display area, which located around the display area. The display area is used to display pictures, and the non-display is used to extract the gate line 70, the data line 80, etc. in the display area to connect to the IC on the circuit board. For example, the non-display area 04 is disposed on the periphery of the display area.

Embodiments of the present invention further provide a display device, the display device comprises the touch display panel 01, and a first integrated circuit (IC) connected to the touch electrode wirings 20 and a second IC connected to the pressure detecting wirings 40. The first IC and the second IC are disposed on a circuit board.

Furthermore, the display device further comprises a third IC connected to the gate line 70 and a fourth IC connected to the data line 80.

Figure 8:
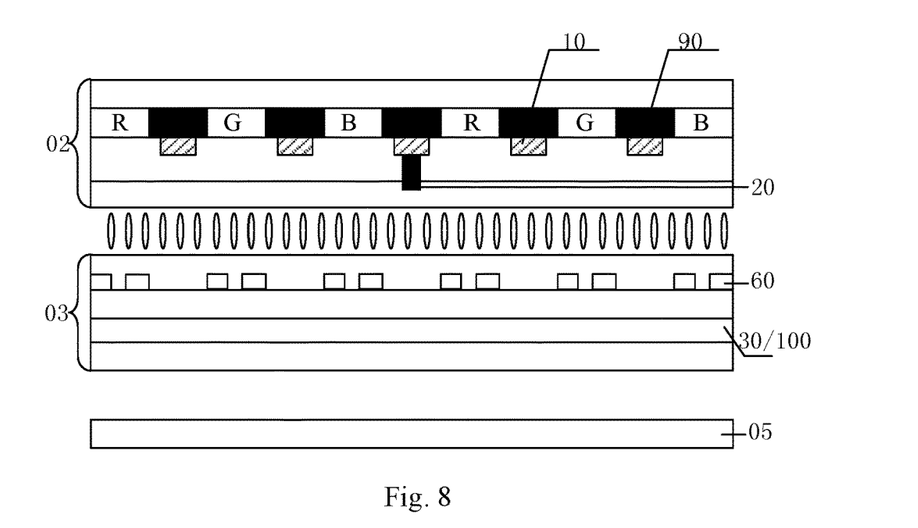
FIG. 8 is a structural view of a display device provided by embodiments of the present invention.

For example, as illustrated in FIG. 8, the display device further comprises a metal back shell 05; the touch display panel 01 is disposed on the metal back shell 05.

In the condition that a back shell of the display device is the metal back shell, a capacitor can also be formed between the pressure detecting electrodes 30 and the grounded metal back shell 05 in embodiments of the present invention.

Thus, sum of the capacitance formed between the pressure detecting electrodes 30 and the touch electrodes 10 as well as that between the pressure detecting electrodes 30 and the metal back shell 05 can detect the pressure. That is, when the display device is under pressure, the deformed touch display panel 01 resulting in that a distance between the pressure detecting electrodes 30 and the touch electrodes 10 as well as that the pressure detecting electrodes 30 and the metal back shell 05 becomes small, so that make the sum of the capacitance formed between the pressure detecting electrodes 30 and the touch electrodes 10 as well as that between the pressure detecting electrodes 30 and the metal back shell 05 becomes large. By comparing with the sum of the capacitance formed between the pressure detecting electrodes 30 and the touch electrodes 10 as well as that between the pressure detecting electrodes 30 and the metal back shell 05 upon being subjected to no pressure, the pressure value can be obtained through a corresponding conversion.

Since the capacitance formed in embodiments of the present invention is the sum of the capacitance between the pressure detecting electrodes 30 and the touch electrodes as well as that the pressure detecting electrodes 30 and the metal back shell 05, the capacitance value is larger and easy to recognize, so that to improve the detecting accuracy.

In some examples, as illustrated in FIG. 8, the pressure detecting electrodes 30 are disposed on the array substrate 03; the pressure detecting electrodes are closer to the metal back shell 05 with respect to the pixel electrode 60 on the array substrate 03.

Due to the overlapping area between the pressure detecting electrodes 30 and the metal back shell 05 is larger, so in order to further improve the detecting accuracy, controlling the distance between the pressure detecting electrodes 30 and the metal back shell 05 to be smaller to increase the capacitance between them. On the basis of this, it is also possible to avoid the influence of the pixel electrode 60 on the capacitor between the pressure detecting electrodes 30 and the metal back shell 05.

Figure 9:
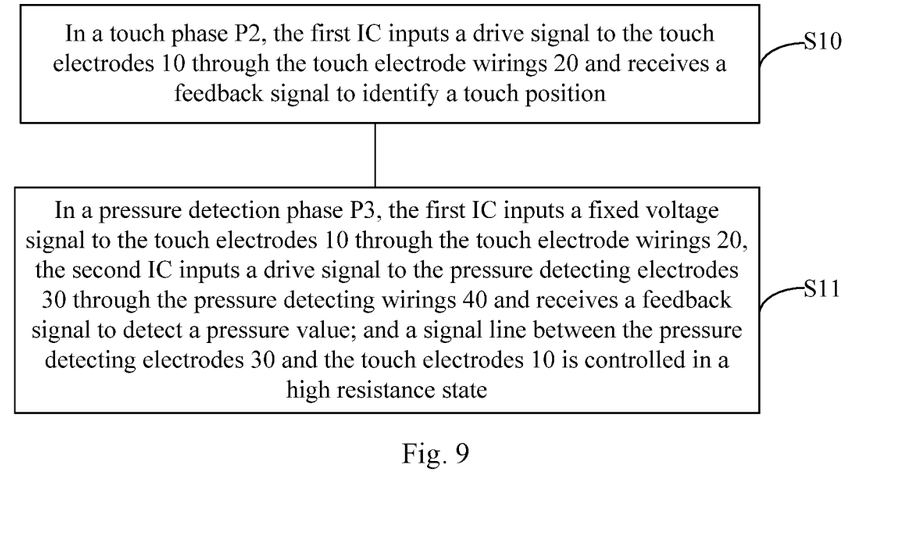
FIG. 9 is a first flow chart of a driving method provided by embodiments of the present invention.

Embodiments of the present invention further provide a driving method of the display device, as illustrated in FIG. 9, the driving method comprises following steps.

Figure 10:
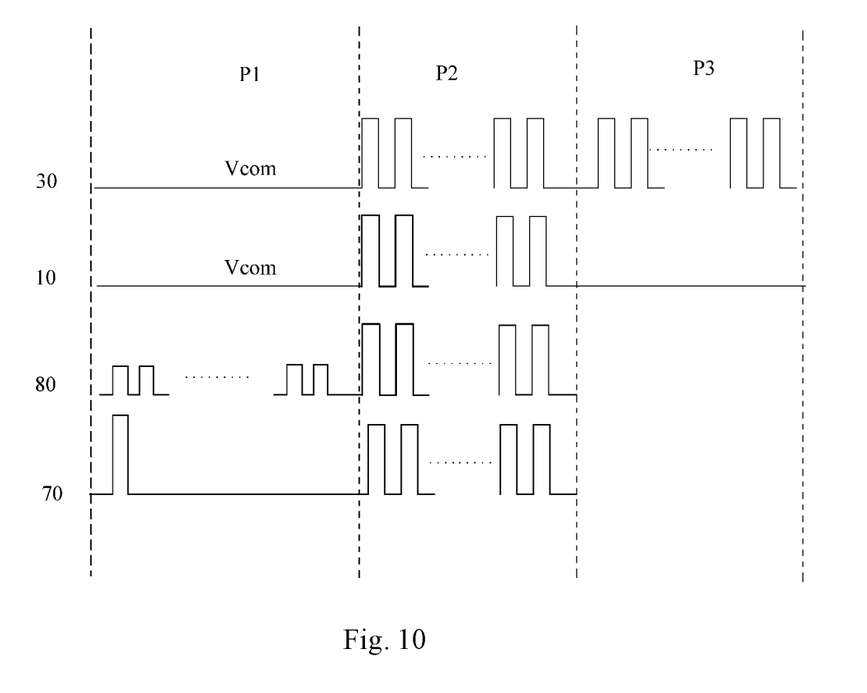
FIG. 10 is a sequence chart in the working process of a display device provided by embodiments of the present invention.

S10: as illustrated in FIG. 10, in a touch phase P2, the first IC inputs a drive signal to the touch electrodes 10 through the touch electrode wirings 20 and receives a feedback signal to identify a touch position.

Here, the pressure detecting electrodes 30, a signal line and so on can be controlled not to work, modulation signals with the same frequency and the same amplitude as those for the touch electrodes 10 can also be certainly input to the pressure detecting electrodes 30, and the signal lines. The signal line comprises the gate line 70 and/or data line 80.

As illustrated in FIG. 10, in the touch phase P2 in embodiments of the present invention, the modulation signals with the same frequency and the same amplitude as those for the touch electrodes 10 are simultaneously input from the second IC to the pressure detecting electrodes 30, from the third IC to the gate line 70, and from the fourth IC to the data line 80, so as to avoid the influence of the pressure detecting electrodes 30, the gate line 70 and the data line 80 etc. on the touch electrodes 10, and to improve the recognition accuracy of the touch position.

S11: as illustrated in FIG. 10, in a pressure detecting phase P3, the first IC inputs a fixed voltage signal (such as a common voltage Vcom signal) to the touch electrodes 10 through the touch electrode wirings 20, the second IC inputs a drive signal to the pressure detecting electrodes 30 through the pressure detecting wirings 40 and receives a feedback signal to detect a pressure value; and a signal line between the pressure detecting electrodes 30 and the touch electrodes 10 is controlled in a high resistance state.

Furthermore, controlling the signal line between the pressure detecting electrodes 30 and the touch electrodes 10 in the high resistance state, the purpose is to avoid the shielding of the signal line to the capacitor between the pressure detecting electrodes 30 and the touch electrodes 10.

The signal line between the pressure detecting electrodes 30 and the touch electrodes 10 can be the gate line 70, can also be the data line 80, and can also be the gate line 70 and the data line 80.

It should be noted that, the first IC and the second IC can be different ICs, and can also be the same IC, it is not limited here.

Furthermore, controlling the signal line between the pressure detecting electrodes 30 and the touch electrodes 10 in the high resistance state, for example, the third IC connected to the gate line 70 is controlled as internal disconnection so that the gate line 70 is in the high impedance state. The fourth IC connected to the data line 80 is controlled as internal disconnection so that the data line 80 is in the high impedance state.

The driving method provided in embodiments of the present invention, on one aspect, the touch position can be realized by inputting the driving signal to the touch electrodes 10 and receiving the feedback signal. One the other aspect, a capacitor is formed between the touch electrodes 10 and the pressure detecting electrodes 30 by inputting the fixed voltage signal to the touch electrodes 10 and inputting the driving signal to the pressure detecting electrodes 30. On the basis of this, when the touch display panel 01 is subject to a pressure, the capacitance between them is changed, and the pressure detecting can be realized by the feedback signal of the pressure detecting electrodes 30.

In some examples, in the condition that the display device further comprises a metal back shell 05, in the pressure detecting phase, the driving method further comprises: controlling a signal line between the pressure detecting electrodes 30 and the metal back shell 05 in a high resistance state.

That is, in this condition, the third IC is controlled as internal disconnection so that the gate line 70 is in the high impedance state. The fourth IC is controlled as internal disconnection so that the data line 80 is in the high impedance state.

Figure 11:
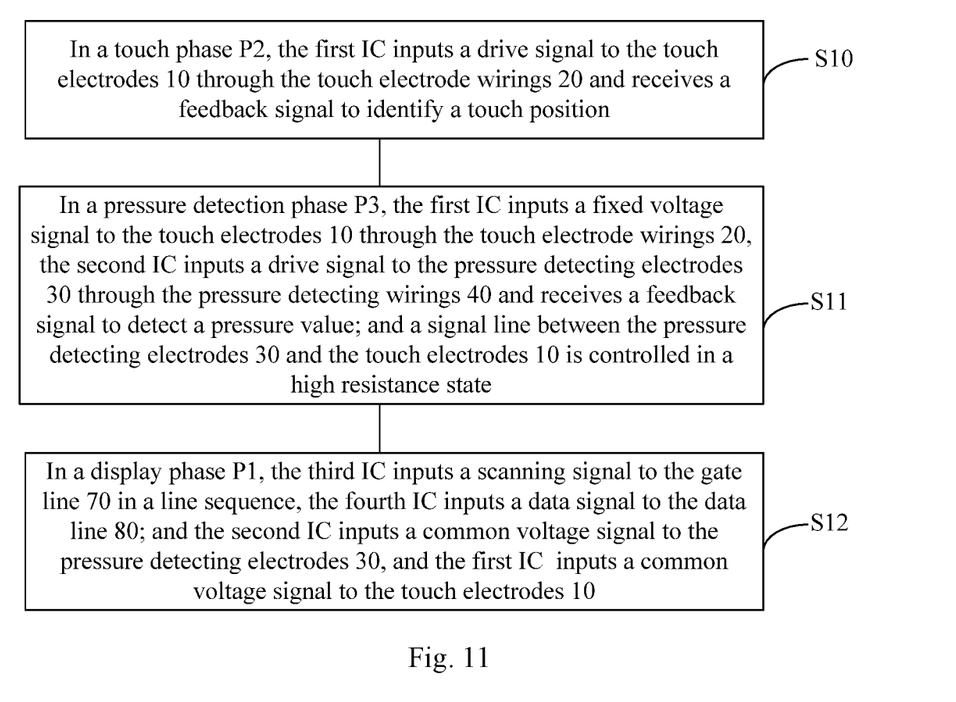
FIG. 11 is a second flow chart of a driving method provided by embodiments of the present invention.

In some examples, as illustrated in FIG. 11, the driving method further comprises:

S12: refer to FIG. 10, in a display phase P1, the third IC inputs a scanning signal to the gate line 70 in a line sequence, the fourth IC inputs a data signal to the data line 80; and the second IC inputs a common voltage signal to the pressure detecting electrodes 30, and the first IC inputs a common voltage signal to the touch electrodes 10.

In the display phase, the pressure detecting electrodes 30 are also used as common electrodes. The touch electrodes 10 are used as a shielding layer to shield an external signal by inputting the common voltage signal to the touch electrodes 10.

The foregoing are only some specific embodiments of the present invention, and the protection scope of the invention is not limited thereto. Therefore, the protection scope of the invention is defined by the claims.

The application claims priority to the Chinese patent application No. 201510580210.7, filed on Sep. 11, 2015, the entire present invention of which is incorporated herein by reference as part of the present application.

What is claimed is:

1. A touch display panel with pressure detecting function, comprising:
    an array substrate and an opposed substrate that are disposed opposite to each other;
    a plurality of touch electrodes and touch electrode wirings each electrically connected to a respective touch electrode of the plurality of touch electrodes disposed on the opposed substrate;
    a plurality of pressure detecting electrodes and pressure detecting electrode wirings each electrically connected to a respective pressure detecting electrode of the plurality of pressure detecting electrodes disposed on the opposed substrate or the array substrate;
    wherein, any of the pressure detecting electrodes overlaps with at least one of the touch electrodes in a direction perpendicular to the opposed substrate; the touch electrodes are closer to a light exit side of the touch display panel with respect to the pressure detecting electrodes,
    wherein, the pressure detecting electrodes are also used as common electrodes.

2. The touch display panel according to claim 1, wherein, the pressure detecting electrodes are disposed on the array substrate.

3. The touch display panel according to claim 2, wherein, the array substrate further comprises a thin film transistor, a gate line and a data line; the gate line is disposed on the same layer as a gate electrode of the thin film transistor, the data line is disposed on the same layer as a source electrode and a drain electrode of the thin film transistor;
    the pressure detecting electrode wirings are disposed on the same layer as the gate line or the data line.

4. The touch display panel according to claim 2, wherein, the array substrate further comprises auxiliary wirings located in a non-display area, the auxiliary wirings correspond to the touch electrode wirings one by one, and the auxiliary wirings are electrically connected to the touch electrode wirings.

5. The touch display panel according to claim 1, wherein, the opposed substrate further comprises a black matrix;
    the touch electrodes are of a lattice structure, and located on a side of the black matrix closer to the array substrate and corresponding to the black matrix;
    wherein, the touch electrodes have a material of metal.

6. The touch display panel according to claim 1, wherein, a capacitor is formed between each of the pressure detecting electrodes and at least one of the touch electrodes overlapping therewith.

7. A display device, comprising the touch display panel according to claim 1, and a first integrated circuit (IC) connected to the touch electrode wirings and a second IC connected to the pressure detecting wirings.

8. The display device according to claim 7, further comprising a metal back shell, the touch display panel is disposed on the metal back shell.

9. The display device according to claim 8, wherein, the pressure detecting electrodes are disposed on the array substrate, the array substrate comprises a pixel electrode;
    the pressure detecting electrodes are closer to the metal back shell with respect to the pixel electrode on the array substrate.

10. The display device according to claim 8, wherein, a capacitor is formed between the pressure detecting electrodes and the metal back shell.

* * * * *

UNITED STATES PATENT AND TRADEMARK OFFICE
CERTIFICATE OF CORRECTION

PATENT NO. : 10,509,510 B2  
APPLICATION NO. : 15/923456  
DATED : December 17, 2019  
INVENTOR(S) : Xiaoliang Ding Page 1 of 1

It is certified that error appears in the above-identified patent and that said Letters Patent is hereby corrected as shown below:

On the Title Page

(73) assignee: should read:  
BOE TECHNOLOGY GROUP CO., LTD., Beijing (CN)  
BEIJING BOE OPTOELECTRONICS TECHNOLOGY CO., LTD., Beijing (CN)

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*